Sept. 22, 1953        G. A. LASKO        2,652,652
DIAL ORNAMENTATION
Filed April 7, 1950        2 Sheets-Sheet 1
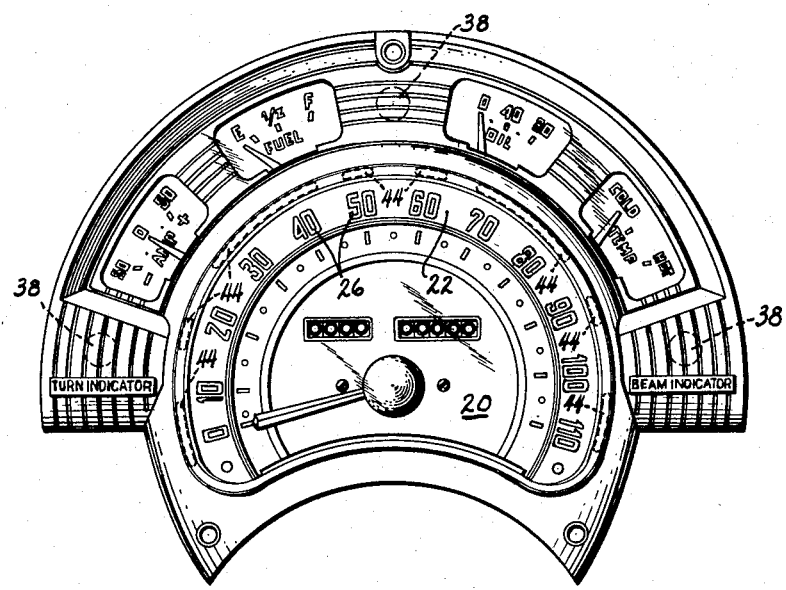
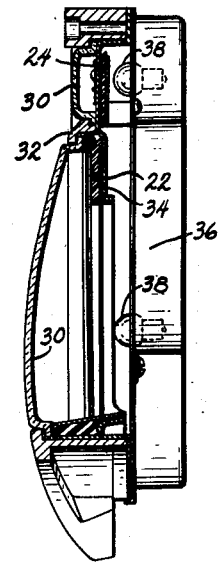
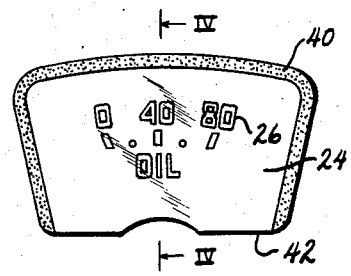
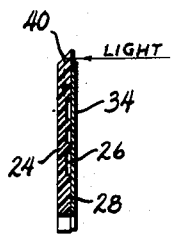
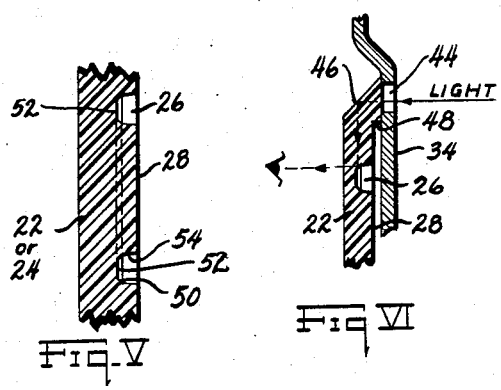
INVENTOR.
George A. Lasko
BY
Falvey, Souther & Stoltenberg Sept. 22, 1953        G. A. LASKO        2,652,652
DIAL ORNAMENTATION
Filed April 7, 1950                           2 Sheets-Sheet 2
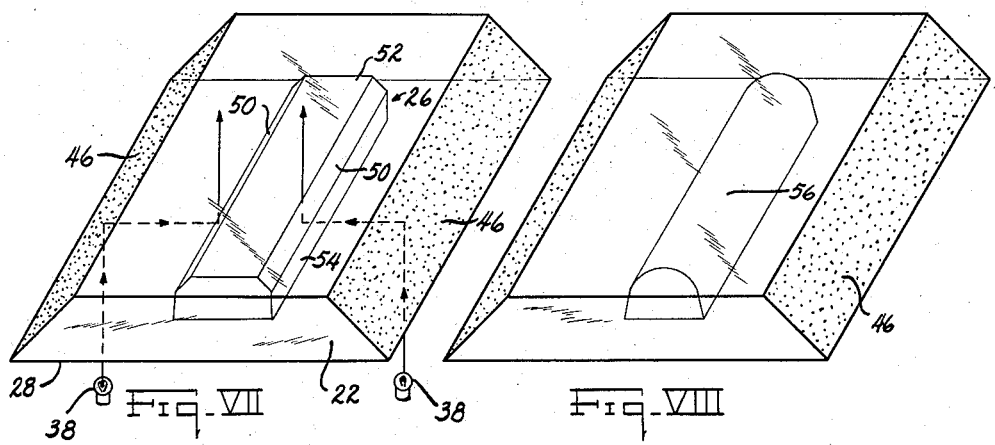
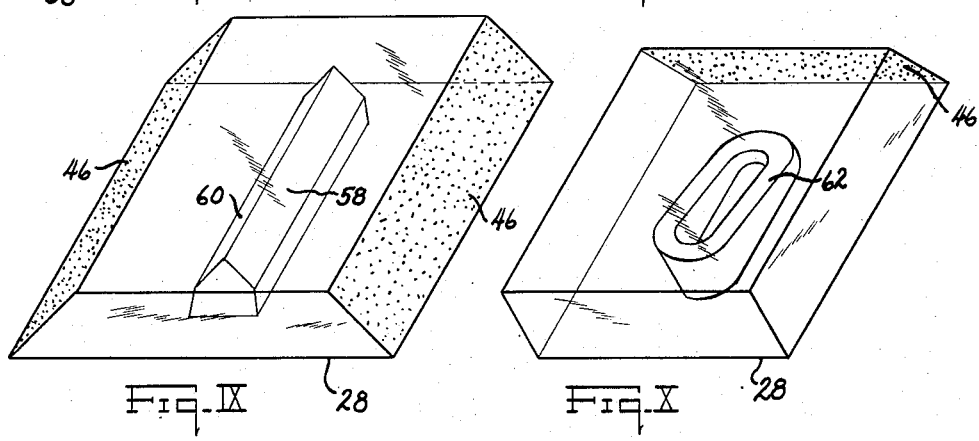
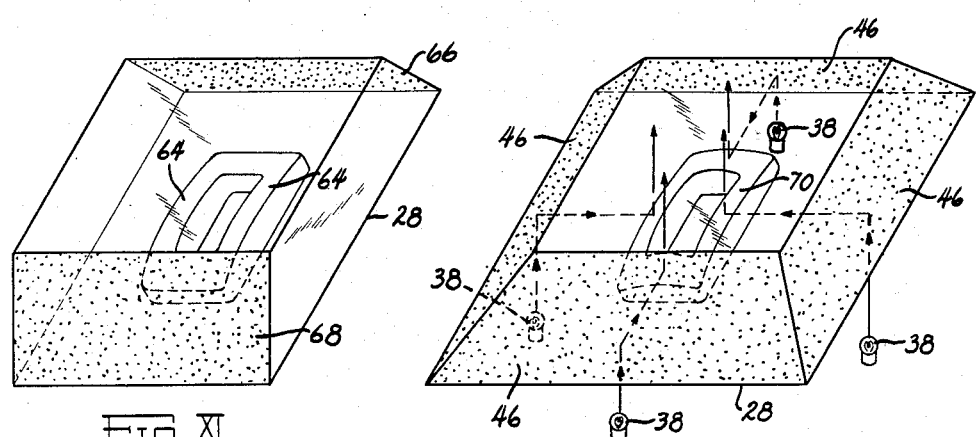
INVENTOR.
George A. Lasko
BY
*Falvey, Souther & Stoltenberg*

Patented Sept. 22, 1953

2,652,652

UNITED STATES PATENT OFFICE 2,652,652

DIAL ORNAMENTATION

George A. Lasko, Toledo, Ohio

Application April 7, 1950, Serial No. 154,530

3 Claims. (Cl. 40—130)

This invention relates to ornamentation, more particularly to ornamentation of the indicia of instrument dials provided with natural illumination and artificial illumination for utilization in darkness.

In the construction of instrument dials such as utilized in dash-board panels for automobiles, it has long been a problem to provide dials wherein the indicia of the indicating instrument gave an ornamental appearance both when observed in natural daylight and also when observed at night illuminated with artificial lighting. The present invention contemplates the provision of a system of ornamentation which utilizes mirror surfaces in connection with the indicia of the dials, so that the indicia are highly reflective in natural light to present a jewel-like appearance to an observer, yet have the reflecting surfaces arranged in a way that when illuminated by artificial light at night by edge-lighting, the indicia will be highly ornamental and pleasing to the eye of the observer.

It is, therefore, a principal object of this invention to provide ornamentation for the indicia of indicating instruments and the like which utilizes mirror surfaces which present a jewel-like appearance under the natural lighting and which are arranged in such a manner that when subjected to artificial light under darkness, a highly ornamental appearance is presented by bright reflected light.

It is a further object of this invention to provide an ornamental face plate for an indicating instrument, which consists of a sheet of transparent material, such as clear molded plastic, which has indicia incised on its back surface coated with a metallic film of mirror-like reflecting qualities, which present a brilliant jewel-like appearance under natural lighting and which are conformed in such a manner that when face plate is edge-lighted from an artificial source of light, the indicia will reflect light to the eye of an observer and present a highly ornamental appearance when viewed in darkness.

It is a further object of this invention to provide a means for utilizing mirror surfaces of a deposited metal film for indicia on the face plate of an indicating instrument which are ornamental to the eye of an observer both when illuminated by natural light or edge-lighted from an artificial source of illumination.

It is a further object of this invention to provide a cheap method of fabricating dial indicia having the appearance of raised block-like characters which have a bright ornamental appearance when illuminated with natural or artificial light, utilizing reflected light.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Referring to the drawings:

Fig. I is an elevational view of an instrument cluster for an automobile to which the invention has been applied;

Fig. II is a sectional elevation of Fig. I;

Fig. III is an elevational view from the front of one of the dials of the instrument cluster;

Fig. IV is a sectional elevation taken along line IV—IV of Fig. III;

Fig. V is an enlarged sectional elevation of an indicium;

Fig. VI is an enlarged sectional elevation of a detail of the cluster;

Fig. VII is a perspective view of an indicium utilizing one form of the invention;

Fig. VIII is a perspective view of another form of the indicia suitable for use with the invention; and Figs. IX, X, XI, and XII are perspective views of other forms of indicia suitable for use with the invention.

Referring now to the drawings, particularly to Fig. I, an instrument cluster is shown, suitable for use on an automotive vehicle, which includes the usual instruments showing the operating conditions of the vehicle. Each of the five instruments shown includes an indicating pointer and a dial having the necessary indicia to cooperate with the pointer to show the separate conditions. This invention relates particularly to the dials with their indicia and to their ornamentation and illumination both under natural lighting conditions found in daylight and under artificial lighting conditions after darkness. The methods of illuminating the pointers of the separate instruments may be obtained artificially after darkness by the use of direct or indirect lighting as distinguished from edge-lighting which is utilized for the artificial illumination of the dials as will be set forth hereinafter. The direct illumination of the pointers by artificial light is accomplished by well known methods and will not be further described.

The instrument cluster shown is arranged concentrically with the speedometer 20 occupying a central location, and the remaining instruments are arranged about its periphery. Each of the instruments has a dial plate or member 22 (for speedometer) and 24 (for the oil pressure gauge) which consists of a flat sheet of transparent plastic material such as acrylics which are compression molded with the indicia 26 molded therein on its rear surface 28 as is best seen in Figs. IV, V, and VI. In front of each dial, a protective lens 30 is provided, held in position by suitable decorative bezels 32. Each rear surface 28 of the dials is provided with a masking plate 34 suitably colored and ornamented for its assembly with the other elements of the cluster. The rear of the cluster is enclosed by a housing 36 which is provided with artificial illumination by light bulbs 38, the interior of the housing being painted to form a reflective surface for increasing the efficiency of such artificial illumination and for diffusing the light rays used for both direct or indirect illumination of the indicating pointers and for edge-illumination of the dial plates 22 and 24 as will be described further hereinafter.

Referring now to Figs. III and IV where a small dial plate or member 24 is illustrated, it will be noted that a portion of the peripheral edge 40 is cut away at a 45° angle, which is painted to reflect and diffuse light entering the rear face 28 above the masking plate 34 as is best seen in Fig. IV. The angular edge portion 40 provides a prismatic device which reflects the light into the edge of the dial plate 24 to provide edge illumination therefor from the sources of artificial illumination provided by the bulbs 38 inside of the housing 36. Each of the four smaller dial plates shown in Fig. I is arranged in the same way. The lower flat edge 42 of the dial plates are also painted to prevent loss of light and also to aid in the diffusion of the light.

Referring now to Fig. VI, it will be noted that the backing plate 34 in this instance is provided with an aperture 44 which cooperates with the dial plate 22 of the speedometer adjacent an angular edge portion 46 in a manner similar to the smaller dial plates already described above. Several apertures 44 are spaced about the periphery of the dial plate 22 as is shown in Fig. I and are given various lengths circumferentially to give a uniform light distribution in the dial plate by its edge illumination accomplished by light entering the apertures 44 from the housing 36 illuminated by the bulbs 38, and being reflected into the edge of the dial plate 22 by the 45° angular edge 46. Preferably, the edge 46 is painted to aid in diffusing and reflecting the light into the edge of the plate. The rear side of the dial plate is undercut to provide a rearwardly-extending circumferential boss 48 to provide a close fit with the backing plate 34 adjacent the locus of the apertures 44 as is clearly shown in Fig. VI.

The structures described above disclosed the methods whereby the dial plates 22 and 24 are edge-lighted by a source of artificial light which is highly diffused by being reflected from the various painted surfaces both in the housing 36 and on the edges of the various dial plates. The diffusion is desirable to avoid glare, inasmuch as brilliant mirror-like surfaces are employed on the indicia as will now be described.

In the instrument cluster shown in Fig. I, the indicia are given a conformation shown in enlarged view in Figs. V and VII, wherein each portion of the indicia is provided with small aligned surfaces 50 at an angle, preferably 45° with the flat front face 52 of the indicia and also with the front and rear sides of the dial plate 22. The indicia are, therefore, outlined by these small oblique surfaces 50 which adjoin the flat front face 52 of the incised indicia as molded into the dial plate in its rear side 28. If desired, the indicia 26 may be molded at a greater depth into the dial plate by providing normal surfaces 54 with the rear face below the angular surfaces 50, as is clearly seen in Figs. V and VII.

The surfaces 50, 52, and 54 of the indicia must have light-transmitting properties and are preferably highly polished which can be conveniently obtained by molding the dial plates by pressure-molding processes using transparent, plastic resins, either of the thermoplastic or thermosetting types. Draft to facilitate removal from the mold must be considered in all cases. The indicia elements on the mold are highly polished to improve the light-transmitting characteristics of the molded surfaces 50, 52, and 54.

It is to be understood that the front and rear surfaces of the dial plate are preferably of parallel conformation but need not be so for all purposes, and also that a curved conformation may be provided for these surfaces, so that the indicia will be given a similar curvature.

After the molding of the dial plate is accomplished, the rear side thereof has deposited upon it a thin layer of bright metal, such as aluminum deposited preferably in a vapor phase as is well understood in the art. The deposit will be continuous and will coat the highly-polished light-transmitting surfaces 50, 52 and 54 of the indicia 26 and also the rear side 28. Thereafter the bright mirror-like coating is removed from the rear side 28 of the dial plate by buffing or the like, leaving the coating on the indicia surfaces intact. The same result can be obtained by selectively depositing the metal in the indicia by masking or the like. For different effects, such as different coloring etc., various metals, such as gold, silver and copper may be used or combination of metals in separate deposits. If desired, protective paint may be applied to the metal coating after depositing which may or may not enter into the decorative scheme as desired, and, as such, may be used as a substitute for the backing plate 34.

When the complete assembly is viewed from the front side in natural daylight, as shown in Fig. I, the backing plate 34, with its contrasting color, will be clearly visible and form a background for the ensemble, against which the incised indicia 26 with their mirror-like metal coating will stand out in brilliant contrast to make the instrument cluster highly ornamental when further enhanced with chrome bezels and the like as shown. The indicia will appear as raised letters of highly polished metal superimposed on the contrasting background, and will present a jewel-like appearance.

After darkness, the bulbs 38 are illuminated to give a source of artificial lighting, which is transmitted into the edge of the dial plate 22 from the rear by the beveled edge as already described. By the use of painted surfaces as reflectors, the artificial lighting is highly diffused which is desirable but not absolutely necessary. The light which enters the dial plate is reflected in part toward the observer by striking the oblique mirror surfaces 50 of the indicia as is best seen in Figs. VI and VII, the remaining surfaces 52 and 54 remaining substantially dark to the observer, who then sees the indicia outlined in bright reflected high light which is again highly ornamental. The surfaces 52 and 54 remain substantially dark due to their angular relation with the light in the dial plate, so that substantially no reflection therefrom is visible to an observer, which is not the case where the indicia is filled with white paint or other light-diffusing media, so that light striking the paint will be diffused and, therefore, visible to the observer in front irrespective of the angular relations. As already disclosed, the indicator pointers are lighted directly or indirectly from the sources of artificial light as is well known in the art.

In Fig. VIII, a modification of the invention is disclosed using a curved surface such as a half-cylinder surface 56 for forming the strokes of the indicia elements, with the lighting and other features being substantially the same. In this instance the observer will see the indicia as a raised bright metallic letter when viewed with natural light as before, and also again in reflected high light when viewed under artificial light. It will be noted that the reflective angles will give this effect on the surface of the half-cylinder forming the indicia stroke. Clearly the surface 50 in the modification shown in Fig. VII could be given a curved contour if desired so as to form a fillet between the sides 52 and 54, to get a similar effect.

In Fig. IX, another modification of the invention is shown where a pair of surfaces 58 and 60 are utilized for the forming of the indicia stroke. The surfaces 58 and 60 are preferably normal to each other and disposed at an angle of 45° with the back 28. When under artificial edge lighting, the whole of each surface 58 and 60 will reflect light to the observer.

In Fig. X, another modification of the invention is shown wherein the front surface 62 of the indicia is a plane at an angle to the rear face 28, tipped in the direction of the beveled side toward the light source as shown to better reflect light. The indicia is to be molded at an angle that would receive light from the edge lighting source to properly illuminate the indicia surface depending upon the position of the observer with reference to the front side of the dial.

In Fig. XI, another modification of the invention is shown wherein the whole front face 64 of the indicia lies in the locus of a cylinder whose axis is parallel with the beveled sides 66 and 68, by which the light is brought into the edge of the dial plate. The whole front face of the indicia reflects the artificial light as seen by an observer.

In Fig. XII, another modification of the invention is shown wherein the whole front face 70 lies in the locus of a sphere, spheroid or other multi-curved surface or in the locus of a pair of intersecting cylinders having different radii. In this manner, the whole front face is tilted outwardly toward the artificial light sources to catch the light better for reflection from the whole front face of the indicia. For some purposes this modification is to be preferred over others where a massive appearance of the indicia is desirable.

It is to be understood that the above detailed description of the present invention is intended to disclose an embodiment thereof to those skilled in the art, but that the invention is not to be construed as limited in its application to the details of construction and arrangement of parts illustrated in the accompanying drawings, since the invention is capable of being practiced and carried out in various ways without departing from the spirit of the invention.

What is claimed:

1. In a molded instrument dial for automotive use adapted to be viewed under daylight wherein light enters the front face of the dial and also with artificial light wherein the light is projected into the edge of the dial, indicia molded into the rear face of the dial by polished mold elements to give a smooth transparent surface to the indicia, and a bright metallic deposit on the surface of the indicia such as provided in the vapor phase of the metal deposited to provide mirror surfaces for the indicia so as to appear as a raised element of highly polished metal when viewed in daylight, wherein the metal deposited on the forward face of the indicia substantially parallel to the front face of the dial forms a brilliant reflective surface for daylight to give the indicia a jewel-like appearance to an observer, said forward face of the indicia being outlined on all its edges by oblique surfaces of substantial area also metallized, positioned at approximately 45° angle to said forward face, which appear substantially darker to an observer in daylight compared to the forward face, but are adapted when artificially illuminated by edge lighting to reflect said artificial light outwardly to outline the indicia at the edges of the forward face in brilliant high light while the forward face is substantially dark.

2. In a molded transparent dial for use with automotive instruments adapted to be viewed under daylight wherein light enters the front face of the dial and also with artificial light wherein the light is projected into the edge of the dial, indicia molded into the rear face of the dial by polished mold elements to give a smooth transparent surface to the indicia, a bright metallic deposit on the surfaces of the indicia such as provided in the vapor phase of the metal deposited to provide mirror surfaces for the indicia so as to appear as a raised element of highly polished metal when viewed in daylight, wherein the metal deposited on the forward face of the indicia substantially parallel to the front face of the dial forms a brilliant reflective surface for daylight to give the indicia a jewel-like appearance to an observer, said forward face of the indicia being outlined on all its edges by oblique surfaces of substantial area also metallized, positioned at approximately 45° angle to said forward face, which appear substantially darker to an observer in daylight compared to the forward face, and means to edge light the dial by artificial light, said oblique surfaces being adapted when artificially illuminated by edge lighting to reflect said artificial light outwardly to outline all of the edges of the forward face of the indicia in brilliant high light while the forward face itself is substantially dark.

3. In a molded transparent instrument dial adapted to be viewed under daylight wherein light enters the front face of the dial and also under artificial lighting conditions wherein the light is projected into the edge of the dial, indicia molded into the rear face of the dial by polished mold elements to give a smooth transparent surface to the indicia, and a bright metallic deposit on the surfaces of the indicia such as provided in the vapor phase of the metal deposited to provide mirror surfaces for the indicia so as to appear as a raised element of highly polished metal when viewed in daylight, wherein the metal deposited on the forward face of the indicia adjacent the front face of the dial forms a brilliant reflective surface for daylight to give the indicia a jewel-like appearance to an observer, said forward face of the indicia being outlined on its edges by receding oblique surfaces of substantial area also metallized, positioned at an angle to said forward face to reflect edge lighting, said oblique surfaces appearing substantially darked to an observer in daylight as compared to the forward face, but are adapted when artificially illuminated by edge lighting to reflect said artificial light outwardly to outline the indicia at the edges of the forward face in brilliant high light while the forward face itself is substantially dark.

GEORGE A. LASKO.

References Cited in the file of this patent

UNITED STATES PATENTS

| Number | Name | Date |
|---|---|---|
| 1,915,511 | Banse | June 27, 1933 |
| 2,005,757 | Scott | June 25, 1935 |
| 2,071,777 | Van Bloem | Feb. 23, 1937 |
| 2,261,578 | Bauer | Nov. 4, 1941 |
| 2,354,857 | Gits | Aug. 1, 1944 |
| 2,475,400 | Osborn | July 5, 1949 |